United States Patent
Tang

(10) Patent No.: US 9,866,357 B2
(45) Date of Patent: Jan. 9, 2018

(54) METHOD AND DEVICE FOR TRANSMITTING REFERENCE SIGNAL SEQUENCE

(71) Applicant: Huawei Technologies Co., Ltd., Shenzhen (CN)

(72) Inventor: Zhenfei Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 14/550,404

(22) Filed: Nov. 21, 2014

(65) Prior Publication Data
US 2015/0078328 A1 Mar. 19, 2015

Related U.S. Application Data

(63) Continuation of application No. PCT/CN2012/075958, filed on May 23, 2012.

(51) Int. Cl.
*H04L 5/00* (2006.01)

(52) U.S. Cl.
CPC ......... *H04L 5/0048* (2013.01); *H04L 5/0023* (2013.01); *H04L 5/0053* (2013.01)

(58) Field of Classification Search
CPC ............... H04L 45/745; H04L 61/6022; H04L 61/2038; H04L 49/3009
See application file for complete search history.

(56) References Cited

U.S. PATENT DOCUMENTS

| 2010/0027446 | A1 | 2/2010 | Choi et al. |
| 2011/0032838 | A1* | 2/2011 | Liu ........................ H04L 5/0032 370/252 |
| 2011/0249633 | A1 | 10/2011 | Hong et al. |
| 2011/0268077 | A1 | 11/2011 | Wan et al. |

(Continued)

FOREIGN PATENT DOCUMENTS

| CN | 101340227 A | 1/2009 |
| CN | 101777941 A | 7/2010 |

(Continued)

OTHER PUBLICATIONS

HTC, "eREG and eCCE Definitions for ePDCCH," 3GPP TSG-RAN WG1 #69, Agenda Item 7.6.4.2, Prague, Czech Republic, R1-122331, May 2012, 7 pages.

(Continued)

*Primary Examiner* — Hassan Kizou
*Assistant Examiner* — Abdullahi Ahmed
(74) *Attorney, Agent, or Firm* — Brinks Gilson & Lione

(57) ABSTRACT

The present invention provides a method and device for transmitting a reference signal sequence. The method includes: determining a position of an eCCE or an eREG mapped to an ePDCCH in a resource block pair; determining, according to corresponding relationship between the position of the eCCE or the eREG in the resource block pair and the antenna port of the reference signal; and transmitting a reference sequence over the antenna port of the reference signal, herein, the corresponding relationship between the position of the eCCE or the eREG in the resource block pair and the antenna port of the reference signal includes that the positions of at least two eCCEs or at least two eREGs correspond to one of the antenna ports of the reference signal.

8 Claims, 4 Drawing Sheets

(56) References Cited

U.S. PATENT DOCUMENTS

| | | | | |
|---|---|---|---|---|
| 2012/0039158 | A1* | 2/2012 | Cheng | H04B 7/0671 370/203 |
| 2012/0182956 | A1 | 7/2012 | Liu et al. | |
| 2013/0215842 | A1* | 8/2013 | Han | H04W 72/042 370/329 |
| 2013/0265667 | A1 | 10/2013 | Liu | |
| 2014/0071935 | A1* | 3/2014 | Papasakellariou | H04L 5/0053 370/330 |
| 2014/0247775 | A1 | 9/2014 | Frenne et al. | |
| 2016/0381667 | A1* | 12/2016 | Frenne | H04W 72/042 370/329 |

FOREIGN PATENT DOCUMENTS

| | | |
|---|---|---|
| CN | 102239647 A | 11/2011 |
| EP | 2 429 094 A1 | 3/2012 |
| JP | 2010-525657 A | 7/2010 |
| JP | 2015-503294 A | 1/2015 |
| KR | 10-2009-0095592 A | 9/2006 |
| KR | 10-0911307 B1 | 8/2009 |
| KR | 10-2011-0112750 A | 10/2011 |
| KR | 10-1646636 B1 | 8/2016 |
| WO | WO 2012/079416 A1 | 6/2012 |

OTHER PUBLICATIONS

Ericsson et al., "On Reference Signal Design for Enhanced Control Channels," 3GPP TSG-RAN WG1 #68, R1-120076, Dresden, Germany, Feb. 2012, 4 pages.

Ericsson et al., "Reference Signals for ePDCCH," 3GPP TSG-RAN WG1 #68bis, R1-121021, Jeju, Republic of Korea, Mar. 2012, 6 pages.

LG Electronics, "Further Discussion on DMRS for ePDCCH," 3GPP TSG RAN WG1 Meeting #69, R1-122886, Prague, Czech Republic, May 2012, 5 pages.

Qualcomm Incorporated, "Reference Signals for e-PDCCH," 3GPP TSG RAN WG1 #69, R1-122791, Prague, Czech Republic, May 2012, 7 pages.

ZTE, "Discussion on DMRS for Enhanced PDCCH," 3GPP TSG RAN WG1 Meeting #68bis, R1-121051, Jeju, Korea, Mar. 2012, 5 pages.

Lte, "3$^{rd}$ Generation Partnership Project; Technical Specification Group Radio Access Network; Evolved Universal Terrestrial Radio Access (E-UTRA); Multiplexing and Channel Coding" (Release 10) 3GPP TS 36.212, V10.5.0, Mar. 2012, 79 pages.

Lte, "3$^{rd}$ Generation Partnership Project; Technical Specification Group Radio Access Network; Evolved Universal Terrestrial Radio Access (E-UTRA); Physical layer procedures" (Release 10) 3GPP TS 36.213, V10.5.0, Mar. 2012, 125 pages.

3$^{rd}$ Generation Partnership Project; Technical Specification Group Radio Access Network; Evolved Universal Terrestrial Radio Access (E-UTRA); Multiplexing and channel coding (Release 10). 3GPP TS 32.212, V10.5.0, Mar. 2012. 79 pgs.

3$^{rd}$ Generation Partnership Project; Technical Specification Group Radio Access Network; Evolved Universal Terrestrial Radio Access (E-UTRA); Physical Channels and Modulation (Release 10). 3GPP TS 36.211, V10.4.0, Dec. 2011. 101 pgs.

3$^{rd}$ Generation Partnership Project; Technical Specification Group Radio Access Network; Evolved Universal Terrestrial Radio Access (E-UTRA); Physical layer procedures (Release 10). 3GPP TS 32.213, V10.5.0, Mar. 2012. 125 pgs.

* cited by examiner

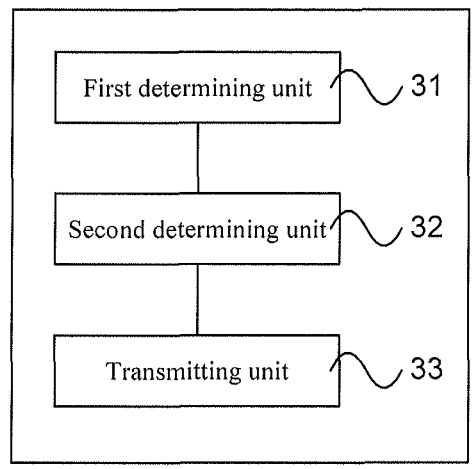
FIG. 3
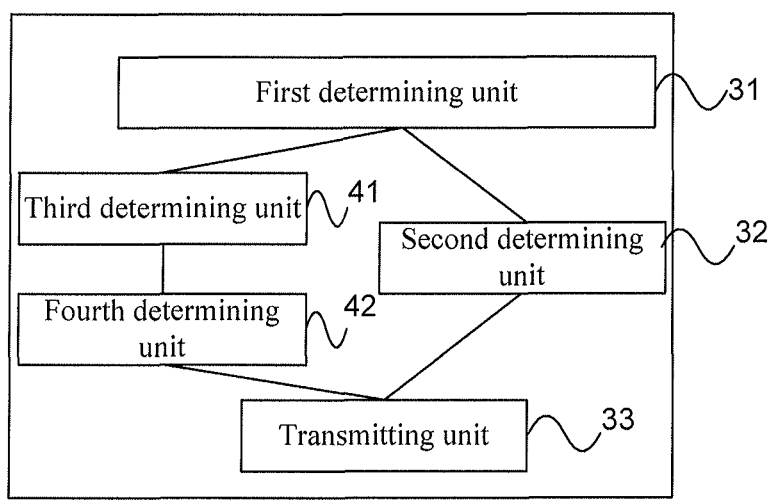
FIG. 4 (1)

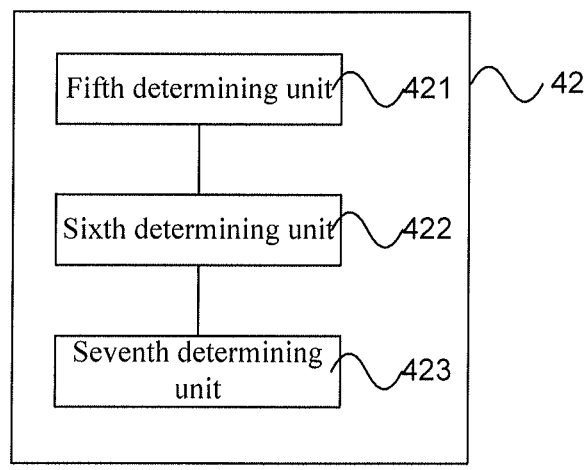
FIG. 4 (2)
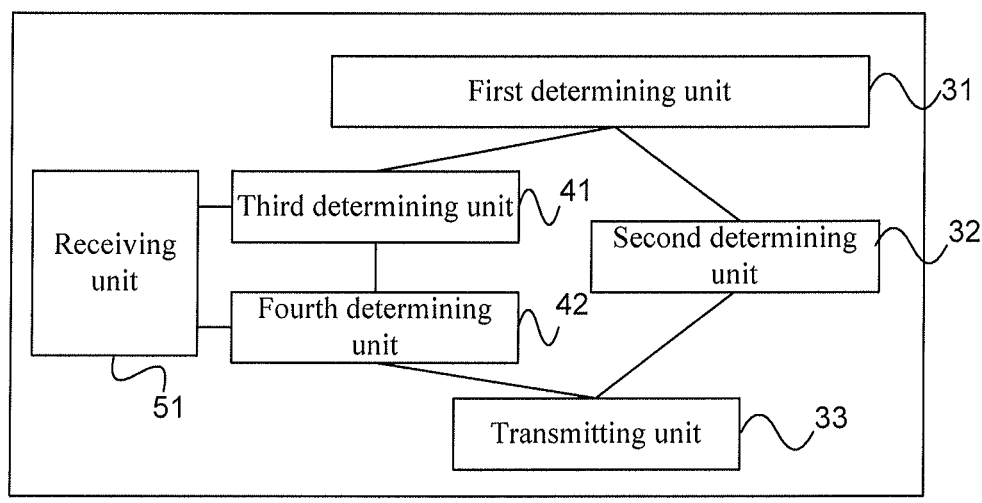
FIG. 5

METHOD AND DEVICE FOR TRANSMITTING REFERENCE SIGNAL SEQUENCE

CROSS-REFERENCE TO RELATED APPLICATIONS

This application is a continuation of International Application No. PCT/CN2012/075958, filed on May 23, 2012, which are hereby incorporated by reference in its entirety.

TECHNICAL FIELD

The present invention relates to communication technologies and, in particular, to a method and device for transmitting a reference signal sequence.

BACKGROUND

In a wireless communication system, such as a long term evolution (Long Term Evolution, LTE) system or a long term evolution advanced (Long Term Evolution Advanced, LTE-A) system, an enhanced physical downlink control channel (Enhanced Physical Downlink Control Channel, ePDCCH) is introduced, and channel estimation for the ePDCCH can be performed by using a reference signal sequence.

When using the reference signal sequence to perform the channel estimation for the ePDCCH, the number of the ePDCCHs in a resource block pair may be greater than the number of antenna ports for transmitting the reference signal sequence, causing that in a condition that the number of the antenna ports is limited, the reference signal sequence may not be able to be transmitted through the antenna ports, and thereby the capacity of using the reference signal sequence to perform the channel estimation to the ePDCCH is reduced.

SUMMARY

Embodiments of the present invention provide a method and device for transmitting a reference signal sequence, which are used to solve the problem that in a condition that the number of antenna ports is limited, the reference signal sequence may not be able to be transmitted through the antenna ports, and thereby the capacity of using the reference signal sequence to perform channel estimation to the ePDCCH is reduced.

In one aspect, embodiments of the present invention provide a method for transmitting a reference signal sequence, including:

determining a position of an enhanced control channel element eCCE or an enhanced resource element group eREG mapped to an enhanced physical downlink control channel ePDCCH in a resource block pair;

determining, according to a corresponding relationship between the position of the eCCE or the eREG in the resource block pair and an antenna port of a reference signal; and transmitting the reference signal sequence over the antenna port of the reference signal;

where the corresponding relationship between the position of the eCCE or the eREG in the resource block pair and the antenna port of the reference signal includes that the positions of at least two eCCEs or at least two eREGs correspond to one of antenna ports of the reference signal.

In another aspect, embodiments of the present invention provide a device for transmitting a reference signal sequence, including:

a first determining unit, configured to determine a position of an enhanced control channel element eCCE or an enhanced resource element group eREG mapped to an enhanced physical downlink control channel ePDCCH in a resource block pair;

a second determining unit, configured to determine, according to a corresponding relationship between the position of the eCCE or the eREG in the resource block pair and the antenna port of the reference signal, where the corresponding relationship between the position of the eCCE or the eREG in the resource block pair and the antenna port of the reference signal includes that the positions of at least two eCCEs or at least two eREGs correspond to one of antenna ports of the reference signal; and a transmitting unit, configured to transmit the reference signal sequence over the antenna port of the reference signal.

Using the technical solutions provided by the present invention, when the number of the ePDCCHs in a resource block pair is greater than the number of the antenna ports, the antenna port for transmitting the reference signal sequence can be determined according to the corresponding relationship between the position of the eCCE or the eREG in the resource block pair and the antenna port of the reference signal, so that the eCCE or the eREG mapped to the ePDCCH can be multiplexed on the antenna port, and further, multiple ePDCCHs can use a same antenna port to transmit different reference signal sequences, thereby solving the problem that when the number of the antenna ports is limited, the reference signal sequence may not be able to be transmitted through the antenna port and thereby the capacity of using the reference signal sequence to perform channel estimation for the ePDCCH is reduced.

BRIEF DESCRIPTION OF DRAWINGS

To describe the technical solutions in embodiments of the present invention or in the prior art more clearly, the accompanying drawings needed for describing the embodiments or the prior art will be introduced briefly in the following. Apparently, the accompanying drawings in the following description illustrate merely some embodiments of the present invention, and persons of ordinary skill in the art may still derive other drawings from these accompanying drawings without creative efforts.

FIG. 3 is a schematic structural diagram of a device for transmitting a reference signal sequence provided by another embodiment of the present invention;

FIG. 4(1) is a schematic structural diagram of a device for transmitting a reference signal sequence provided by another embodiment of the present invention;

FIG. 4(2) is a schematic structural diagram of the fourth determining unit according to the embodiment corresponding to the FIG. 4(1);

FIG. 5 is a schematic structural diagram of a device for transmitting a reference signal sequence provided by another embodiment of the present invention.

DESCRIPTION OF EMBODIMENTS

To make the objectives, technical solutions, and advantages of embodiments of the present invention clearer, the technical solutions in embodiments of the present invention will be clearly and comprehensively described in the following with reference to the accompanying drawings in embodiments of the present invention. Apparently, the described embodiments are merely a part rather than all embodiments of the present invention. All other embodiments obtained by persons of ordinary skill in the art based on embodiments of the present invention without creative efforts shall fall within the protection scope of the present invention.

The technical solution of the present invention can be applied to various wireless communication systems, such as: a global system for mobile communications (Global System for Mobile Communications, referred to as GSM), a general packet radio service (General Packet Radio Service, referred to as GPRS) system, a code division multiple access (Code Division Multiple Access, referred to as CDMA) system, a CDMA2000 system, a wideband code division multiple access (Wideband Code Division Multiple Access, referred to as WCDMA) system, a long term evolution (Long Term Evolution, referred to as LTE) system, a long term evolution advanced (Long Term Evolution Advanced, LTE-A) system or a world interoperability for microwave access (World Interoperability for Microwave Access, referred to as WiMAX) system and so on.

The technical solutions of the present invention can be applied to different configurations of the above systems, such as the configuration of a normal cyclic prefix (normal cyclic prefix, referred to as normal CP) or an extended cyclic prefix (extended cyclic prefix, referred to as extended CP) in an LTE/LTE-A system.

The base station may be a base transceiver station (Base Transceiver Station, referred to as BTS) in the GSM system, the GPRS system or the CDMA system, may also be a nodeB (NodeB) in the CDMA2000 system or the WCDMA system, may also be an evolved nodeB (Evolved NodeB, referred to as eNB) in the LTE system, may also be an access service network base station (Access Service Network Base Station, referred to as ASN BS) in the WiMAX network, and other Network Elements.

In addition, the term "and/or" herein is merely a relationship for describing associated objects, which represents there may be three types of relationship, for example, A and/or B, may represent the three conditions: A exists alone, A and B exist at the same time, and B exists alone. In addition, the character "/" in this application generally indicates the relationship between the objects before it and after it is "or".

Figure 1:
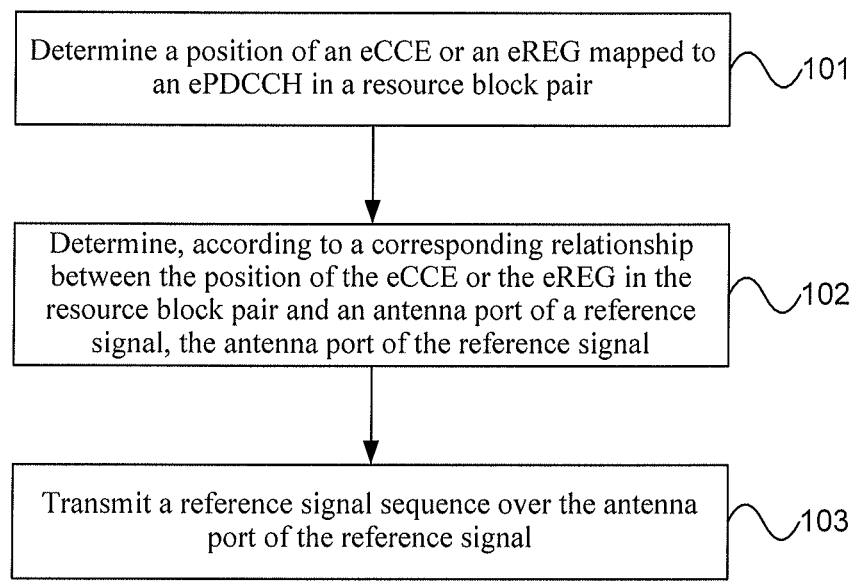
FIG. 1 is a schematic flowchart of a method for transmitting a reference signal sequence provided by an embodiment of the present invention.

Referring to FIG. 1, an embodiment of the present application provides a method for transmitting a reference signal sequence.

101. Determine a position of an eCCE or an eREG mapped to an ePDCCH in a resource block pair.

It should be noted that, a resource block pair may include two resource blocks. Resource blocks (Resource Block, RB) may be divided into physical layer resource blocks (Physical Resource Block, PRB) and virtual resource blocks (Virtual Resource Block, VRB). The PRB refers to a position of an actual frequency of the resource block, which is numbered from smallest to greatest; the VRB is another way of numbering which is different from the PRB, and the VRB may be mapped to the PRB through a specific resource allocating method. The position of an eCCE or an eREG mapped to an ePDCCH in a resource block pair can include a serial number of the eCCE or the eREG in the resource block pair. The ePDCCH of a different user equipment may be mapped to a different eCCE or eREG.

The eCCE or eREG is the smallest resource mapped to the ePDCCH, which is a RE set composed of some resource elements (Resource Element, RE). Specifically, a PRB pair may be divided into 4 or more eCCEs or eREGs. An ePDCCH occupied by a user equipment needs to use at least one eCCE or eREG. The position of an eCCE or an eREG mapped to an ePDCCH in a resource block pair may be the position of the eCCE or the eREG, which is used when the ePDCCH is occupied by the user equipment, in the resource block pair.

102. Determine, according to a corresponding relationship between the position of the eCCE or the eREG in the resource block pair and an antenna port of a reference signal, the antenna port of the reference signal. Where the corresponding relationship between the position of the eCCE or the eREG in the resource block pair and the antenna port of the reference signal includes that the positions of at least two eCCEs or at least two eREGs are corresponding to one of antenna ports of the reference signals.

In the embodiment of the present invention, the corresponding relationship between the position of the eCCE or the eREG in the resource block pair and the antenna port of the reference signal may be preset, for example be agreed on in a protocol. The preset corresponding relationship between the position of the eCCE or the eREG in the resource block pair and the antenna port of the reference signal may be that, when the ePDCCHs occupied by different user equipments need to be multiplexed in one resource block pair, the respective ePDCCHs of the different user equipments are mapped to different eCCEs or eREGs, so that it can be achieved that the ePDCCHs of different user equipments can use different antenna ports, or the ePDCCHs of different user equipments can use the same antenna port but different reference signal sequences.

For example, in the case of an extended CP, currently only the antenna port 7 and antenna port 8 are available to use. In the case of the extended CP, if the number of user equipments is more than two, then it may be impossible to transmit the corresponding reference signal sequences via the antenna ports. In the technical solution provided by the present invention, different user equipments (specifically may be ePDCCHs occupied by different user equipments) are mapped to different eCCEs or eREGs, and the antenna port which can be used to transmit the reference signal sequence is determined according to the position of the eCCE or the eREG in the resource block pair. In the case of the extended CP, only the antenna port 7 and antenna port 8 are available to use, ePDCCHs occupied by different user equipments are mapped to different eCCEs or eREGs. Take a resource block pair including 4 eCCEs or eREGs as an example, the serial numbers of which are respectively eCCE0, eCCE1, eCCE2, and eCCE3. Optionally, the eCCE or eREG of which the serial number is an even number corresponds to antenna port 7, the eCCE or eREG of which the serial number is an odd number corresponds to antenna port 8; or, alternatively the eCCE or eREG of which the serial number is an even number corresponds to antenna port 8, the eCCE or eREG of which the serial number is an odd number corresponds to antenna port 7. Optionally, in the case of the extended cyclic prefix, CP, the eCCE or eREG of which the serial number is 1 to n corresponds to antenna port 7, and the eCCE or eREG of which the serial number is n+1 to N corresponds to antenna port 8; or, in the case of the extended CP, the eCCE or eREG of which the serial number is 1 to n corresponds to antenna port 8, and the eCCE or eREG of which the serial number is n+1 to N corresponds to antenna port 7, where N is the total number of the eCCEs or eREGs, n is a positive integer greater than or equal to 1 and less than or equal to N.

Taking the LTE system as an example, for the corresponding relationship between the position of the eCCE or the eREG and the antenna port, reference can be made to table 1 or table 2. The persons skilled in the art should understand that, the corresponding relationship described in table 1 or table 2 is for reference, the present invention is not limited thereto.

TABLE 1

Corresponding relationship between the position of eCCE or the eREG and the antenna port

| Position of eCCE or eREG | Antenna port |
|---|---|
| eCCE0 | antenna port 7 |
| eCCE1 | antenna port 8 |
| eCCE2 | antenna port 7 |
| eCCE3 | antenna port 8 |

TABLE 2

Corresponding relationship between the position of eCCE or eREG and the antenna port

| Position of eCCE or eREG | Antenna port |
|---|---|
| eCCE0 | antenna port 8 |
| eCCE1 | antenna port 7 |
| eCCE2 | antenna port 8 |
| eCCE3 | antenna port 7 |

Optionally, when the executive entity of this embodiment is a user equipment, then the user equipment can receive the corresponding relationship between the position of the eCCE or the eREG and the antenna port sent by a base station via a high-layer signaling.

For example, the high-layer signaling may be a radio resource control (Radio Resource Control, RRC) message, specifically a subframe parameter can be carried by an information element (Information Element, IE) in the RRC message, the RRC message may be an RRC message in the prior art, for example, an RRC connection setup message, an RRC connection reconfiguration message or an RRC connection re-establishment message and so on, which will not be limited in this embodiment, and the IE in the existing RRC message can be extended to carry the corresponding relationship. Or, the RRC message may be different from the existing RRC message in the prior art.

For another example, the high-layer signaling may also be a media access control (Media Access Control, MAC) control element (Control Element, CE) message, and the corresponding relationship is carried by adding a new MAC CE.

103. Transmit a reference signal sequence over the antenna port of the reference signal.

It should be noted that, the executive entity of the above steps 101~103 may be a base station, or may also be a user equipment, which will not be limited in the present invention.

Specifically, for step 103, a base station may perform transmitting the reference signal sequence transmitted in the ePDCCH, over the antenna port of the reference signal; a user equipment may perform receiving the reference signal sequence transmitted in the ePDCCH, over the antenna port.

In this embodiment, by determining the position of the eCCE or the eREG mapped to the ePDCCH in a resource block pair and then determining the antenna port corresponding to the position, the eCCEs or the eREGs mapped to the ePDCCHs can be multiplexed on the antenna ports, and further, a plurality of ePDCCHs can use a same antenna port to transmit different reference signal sequences, in this way, the problem that the user equipment can not perform channel estimation for each ePDCCH, caused by that the number of the ePDCCHs in a resource block pair may be greater than the number of the antenna ports, can be avoided, and accordingly the capacity of channel estimation of the user equipment can be increased.

Figure 2:
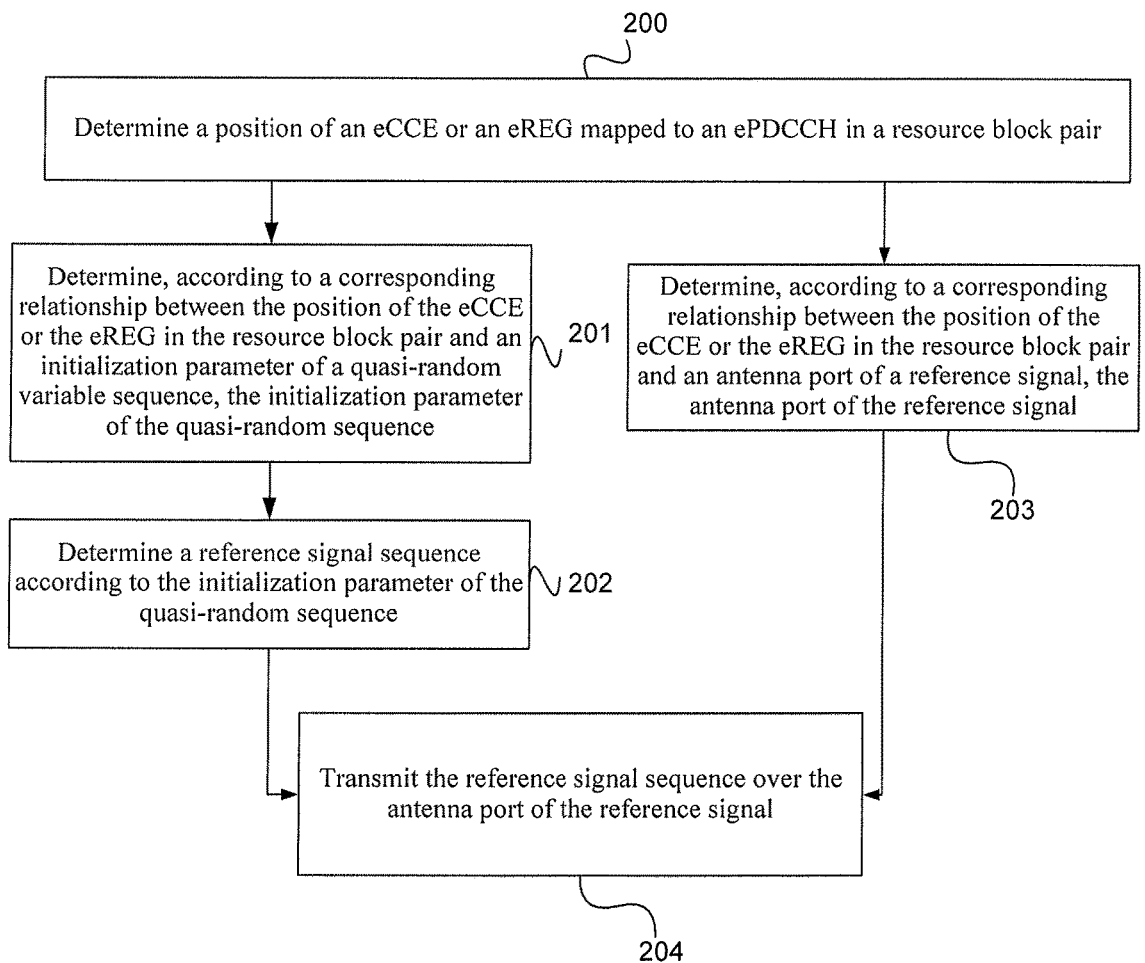
FIG. 2 is a schematic flowchart of a method for transmitting a reference signal sequence provided by another embodiment of the present invention.

Another embodiment of the present invention provides a method for transmitting a reference signal sequence. Referring to FIG. 2, the method is a further extended and refined based on the embodiment according to FIG. 1.

200. Determine a position of an eCCE or an eREG mapped to an ePDCCH in a resource block pair.

It should be noted that, step 200 is similar to step 101 in the embodiment as shown in FIG. 1, which will not be repeated herein.

201. Determine, according to a corresponding relationship between the position of the eCCE or the eREG in the resource block pair and an initialization parameter of a quasi-random sequence, the initialization parameter of the quasi-random sequence.

Optionally, in step 201, the position of at least one eCCE or of at least one eREG mapped to one ePDCCH may be denoted by the serial number of at least one eCCE or at least one eREG. In step 201, the serial number of the at least one eCCE or the at least one eREG mapped to the ePDCCH in the resource block pair may specifically be determined; or, the smallest serial number of the eCCE or the eREG among the serial numbers of the eCCEs or the eREGs mapped to the ePDCCH in the resource block pair may be determined.

For example, in the case that an aggregation level is 1 (that is, in a resource block pair, an ePDCCH is mapped to one eCCE or one eREG), the serial number of the eCCE or the eREG mapped to the ePDCCH in the resource block pair may specifically be determined, and is used as the position of the eCCE or the eREG mapped to the ePDCCH in the resource block pair.

For example, in the case that the aggregation level is 2 (that is, in a resource block pair, an ePDCCH is mapped to two eCCEs or two eREGs), the smaller eCCE or eREG serial number of the serial numbers of the two eCCE or the two eREGs mapped to the ePDCCH in the resource block pair may specifically be determined.

For example, in the case that aggregation level is 4 (that is, in a resource block pair, an ePDCCH is mapped to four eCCEs or four eREGs), the smallest eCCE or eREG serial number among the serial numbers of the four eCCEs or the four eREGs mapped to the ePDCCH in the resource block pair may specifically be determined.

Optionally, when the executive entity of step 201 is a user equipment, the user equipment may further obtain a preconfigured corresponding relationship between the position of the eCCE or the eREG in the resource block pair and the initialization parameter of the quasi-random sequence, for example being agreed on in a protocol.

Optionally, when the executive entity of step 201 is a user equipment, the user equipment may further receive the corresponding relationship between the position of the eCCE or the eREG in the resource block pair and the initialization parameter of the quasi-random sequence. Specifically, the user equipment may specifically receive the corresponding relationship between the position of the eCCE or the eREG in the resource block pair and the initialization parameter of the quasi-random sequence sent by a base station via a high-layer signaling.

For example, the high-layer signaling may be a radio resource control (Radio Resource Control, RRC) message, specifically an information element (Information Element, IE) in the RRC message may be used to carry the sub-frame parameters, the RRC message may be the RRC message in the prior art, for example, an RRC connection setup message, an RRC connection reconfiguration message or an RRC connection re-establishment message and so on, which will not be limited in this embodiment, and the IE in the existing RRC message is extended to carry the corresponding relationship, or the RRC message may be different from the existing RRC message in the prior art.

For another example, the high-layer signaling may also be a media access control (Media Access Control, MAC) control element (Control Element, CE) message, and the corresponding relationship is carried by adding a new MAC CE.

Optionally, in step 201, according to the corresponding relationship between the position of the eCCE or the eREG in the resource block pair and the initialization parameter of the quasi-random sequence, a group of initialization parameters of the quasi-random sequence corresponding to the position of at least one eCCE or eREG mapped to the ePDCCH in the resource block pair can be specifically determined. Accordingly, according to the determined group of initialization parameters of the quasi-random sequence, a reference signal sequence supporting ePDCCH transmission can be determined.

Take a resource block pair including 4 eCCEs or 4 eREGs as an example, which are respectively numbered as eCCE0, eCCE1, eCCE2, and eCCE3. Taking an LTE system as an example, for the corresponding relationship between the position of the eCCE or the eREG and the initialization parameter of the quasi-random sequence, reference may be made to table 3. It should be appreciated by the persons skilled in the art that, the corresponding relationship in table 3 is for reference, but not intends to limit the present invention.

TABLE 3

Corresponding relationship between the position of eCCE or eREG and the initialization parameters of a quasi- random variable sequence

| Position of eCCE or eREG | Initialization parameters of quasi-random sequence Scrambling identifier $n_{SCID}$ (value is 0 or 1) and/or X (value is 0 to 503) |
|---|---|
| eCCE0 | $n_{SCID} = 0$; or <br> $X = X (0)$; or <br> $n_{SCID} = 0$, and $X = X (0)$ |
| eCCE1 | $n_{SCID} = 0$, or <br> $X = X (0)$; or <br> $n_{SCID} = 0$, and $X = X (0)$ |
| eCCE2 | $n_{SCID} = 1$; or <br> $X = X (1)$; or <br> $n_{SCID} = 1$, or $X = X (1)$ |
| eCCE3 | $n_{SCID} = 1$; or <br> $X = X (1)$; or <br> $n_{SCID} = 1$, and $X = X (1)$ |

Optionally, in step 201, at least two groups of initialization parameters of the quasi-random sequence corresponding to the position of at least one eCCE or eREG mapped to the ePDCCH in the resource block pair can be specifically determined according to the corresponding relationship between the position of the eCCE or the eREG in the resource block pair and the initialization parameter of the quasi-random sequence. Accordingly, one group of initialization parameters of the quasi-random sequence may be selected out from the at least two groups of initialization parameters of the quasi-random sequence; according to the selected group of initialization parameters of the quasi-random sequence, a reference signal sequence supporting the ePDCCH transmission may be determined.

Take a resource block pair including 4 eCCEs or eREGs as an example, which are respectively numbered as eCCE0, eCCE1, eCCE2, and eCCE3. Taking an LTE system as an example, for the corresponding relationship between the position of the eCCE or the eREG and the initialization parameter of the quasi-random sequence, reference can be made to table 4. It should be appreciated by the persons skilled in the art that, the corresponding relationship in table 4 is for reference, but not intends to limit the present invention.

TABLE 4

Corresponding relationship between the position of eCCE or eREG and the initialization parameters of a quasi- random variable sequence

| Position of eCCE or eREG | Initialization parameters of quasi-random sequence Scrambling identifier $n_{SCID}$ (value is 0 or 1) and/or X (value is 0 to 503) |
|---|---|
| eCCE0 | $n_{SCID} = 0$ or 1; or <br> $X = X (0)$ or $X (1)$; or <br> $n_{SCID} = 0$ or 1, and $X = X (0)$ or $X (1)$ |
| eCCE1 | $n_{SCID} = 0$ or 1; or <br> $X = X (0)$ or $X (1)$; or <br> $n_{SCID} = 0$ or 1, and $X = X (0)$ or $X (1)$ |
| eCCE2 | $n_{SCID} = 1$ or 0; or <br> $X = X (1)$ or $X (0)$; or <br> $n_{SCID} = 0$ or 1, and $X = X (1)$ or $X (0)$ |
| eCCE3 | $n_{SCID} = 1$ or 0; or <br> $X = X (1)$ or $X (0)$; or <br> $n_{SCID} = 0$ or 1, and $X = X (1)$ or $X (0)$ |

Herein, the strategy of selecting one group of initialization parameters of the quasi-random sequence out from the at least two groups of initialization parameters of the quasi-random sequence may be as follows:

Specifically, a group of initialization parameters of the quasi-random sequence can be selected out from the at least two groups of the initialization parameters of the quasi-random sequence according to the user equipment's radio network temporary identifier (Radio Network Temporary Identifier, RNTI). For example, when the user equipment's RNTI is an odd number, the first group of initialization parameters is selected; when the user equipment's RNTI is an even number, the second group of initialization parameters is selected.

Specifically, one group of initialization parameters of the quasi-random sequence may be selected out from the at least two groups of initialization parameters of the quasi-random sequence according to a predefined rule. For example, select the group of initialization parameters which is minimum in the initialization parameters, or select the group of initialization parameters which is maximum in the initialization parameters, or select an even value or an odd value in the initialization parameters.

Optionally, if the executive entity of this embodiment is a user equipment, then the user equipment may receive a high-layer signaling sent by a base station, and the selection strategy is included in the high-layer signaling.

For example, the high-layer signaling may be a radio resource control (Radio Resource Control, RRC) message, specifically an information element (Information Element, IE) in the RRC message may be used to carry sub-frame parameters, the RRC message may be an RRC message in the prior art, for example, an RRC connection setup message, an RRC connection reconfiguration message or an RRC connection re-establishment message etc., which will not be limited in this embodiment, and the IE in the existing RRC message is extended to carry the corresponding relationship. Or, the RRC message may be different from the existing RRC message in the prior art.

For another example, the high-layer signaling may also be a media access control (Media Access Control, MAC) control element (Control Element, CE) message, and the corresponding relationship is carried through adding a new MAC CE.

202. Determine a reference signal sequence according to the initialization parameter of the quasi-random sequence.

Optionally, taking the LTE system as an example, step 202 may specifically include:

202-1. Determine the initialization value of the quasi-random sequence according to the initialization parameter of the quasi-random sequence. For example, the initialization value $c_{init}$ of the quasi-random sequence may be determined according to $c_{init}=(\lfloor n_s/2 \rfloor+1) \times (2X+1) \times 2^{16}+n_{SCID}$; where, $n_s$ is a slot number; $n_{SCID}$ is a scrambling identifier; $n_{SCID}$ and/or X is the initialization parameters of the quasi-random sequence; the value of $n_{SCID}$ is 0 or 1; the value of X is from 0 to 503.

202-2. Determine the quasi-random sequence corresponding to the initialization value of the quasi-random sequence according to the initialization value of the quasi-random sequence. For example, a gold sequence may be generated according to the initialization value $c_{init}$ of the quasi-random sequence generated in step 202-1, and be taken as the quasi-random sequence corresponding to the initialization value of the quasi-random sequence.

202-3. Determine, according to the quasi-random sequence, the reference signal sequence supporting ePDCCH transmission.

For example, it may be according to $$r(m) = \frac{1}{\sqrt{2}}(1-2 \cdot c(2m)) + j \frac{1}{\sqrt{2}}(1-2 \cdot c(2m+1)),$$

$$m = \begin{cases} 0, 1, \ldots, 12N_{RB}^{max,DL}-1 & \text{in a case of normal } CP \\ 0, 1, \ldots, 16N_{RB}^{max,DL}-1 & \text{in a case of extended } CP \end{cases}$$

where c(2m) and c(2m+1) are the quasi-random sequence, r(m) is the reference signal sequence supporting the ePDCCH transmission.

203. Determine, according to a corresponding relationship between the position of the eCCE or the eREG in the resource block pair and an antenna port of a reference signal, the antenna port of the reference signal.

Step 203 is similar to step 102 in the embodiment as shown in FIG. 1, and the details will not be repeated herein.

204. Transmit the reference signal sequence over the antenna port of the reference signal.

Persons of ordinary skill in the art should understand that, the execution order of step 203 between steps 200 to 204 is not fixed. Steps 201-202 are used to determine the reference signal sequence according to the position of the eCCE or the eREG in the resource block pair. Step 203 is used to determine the antenna port according to the position of the eCCE or the eREG in the resource block pair. Step 204 is used to transmit the reference signal sequence over the determined antenna port.

By using the technical solutions provided by the present invention, according to the position of the eCCE or the eREG in the resource block pair, the antenna port corresponding to the position and the reference signal sequence corresponding to the position can be determined, so that the eCCEs or the eREGs mapped to the ePDCCHs can be multiplexed on the antenna ports. Furthermore, multiple ePDCCHs can use a same antenna port to transmit different reference signal sequences, thereby solving the problem that when the number of the antenna ports is limited, the capacity of using the reference signal sequence to perform channel estimation for the ePDCCH is reduced since the reference signal sequence may not be able to be transmitted through the antenna port.

Furthermore, if the base station directly notifies the user equipment of relevant parameters of the reference signal sequence via a high-layer signaling, this approach may result in each user equipment being statically bound or semi-statically bound to the reference signal sequence, and cause that the user equipment corresponding to the same antenna port and reference signal sequence can never be multiplexed in one resource block pair, and thus the flexibility of multiplexing the user equipments is reduced. Using the technical solution provided in the present invention, dynamic binding between each user equipment and the reference signal sequence can be achieved, and when different user equipments need to be multiplexed in one resource block pair, only the respective ePDCCH of different user equipments are needed to be dynamically adjusted to be mapped to different eCCEs or eREGs, and then, since the antenna port can be determined according to the position of the eCCE or the eREG in a resource block pair, it can be achieved that different user equipments use different antenna ports, or different user equipments use a same antenna port and different reference signal sequences, so that the different user equipments can be multiplexed in one resource block pair, and thereby the flexibility of multiplexing the user equipments is increased.

Furthermore, using the technical solution provided by the present invention, the base station may not directly notify the user equipment of the parameters of reference signal sequences via a high-layer signaling, and therefore the overhead of the air interface signaling can be reduced and the air interface resource can be saved.

It should be noted that, in each of the aforementioned method embodiments, for the sake of make the description simple, it is expressed as a combination of a series of actions, but the persons skilled in the art should be aware that, the present invention is not limited by the described order of the actions, since according to the present invention, certain steps may be performed in a different order or be performed simultaneously. Besides, the persons skilled in the art will also be aware of that, all the embodiments described in the specification are the preferred embodiments, and the actions and the modules involved are not necessarily required in the present invention.

In the above embodiment, the description of each embodiment has its own emphasis. For contents not described in detail in one embodiment, reference may be made to related contents in other embodiments.

FIG. 3 is a schematic structural diagram of a device for transmitting a reference signal sequence provided by another embodiment of the present invention. As shown in FIG. 3, the device for transmitting the reference signal sequence in this embodiment may includes a first determining unit 31, a second determining unit 32 and a transmitting unit 33.

The first determining unit 31 is configured to determine a position of an eCCE or an eREG mapped to an ePDCCH, in a resource block pair.

The second determining unit 32 is configured to determine, according to a corresponding relationship between the position of the eCCE or the eREG in the resource block pair and the antenna port of the reference signal. Where the corresponding relationship between the position of the eCCE or the eREG in the resource block pair and the antenna port of the reference signal includes that the positions of at least two eCCEs or at least two eREGs correspond to one of antenna ports of the reference signal.

The transmitting unit 33 is configured to transmit a reference signal sequence over the antenna port of the reference signal.

It should be noted that, a resource block pair may include two resource blocks. Resource blocks (Resource Block, RB) may be divided into physical layer resource blocks (Physical Resource Block, PRB) and virtual resource blocks (Virtual Resource Block, VRB). The PRB is the position of the resource block's actual frequency, which is numbered from smallest to greatest; the VRB is another way of numbering which is different from the PRB, and the VRB may be mapped to the PRB through a specific resource allocating method. The position of the eCCE or the eREG mapped to the ePDCCH in the resource block pair may include the serial number of the eCCE or the eREG in the resource block pair. The ePDCCHs of different user equipments may be mapped to different eCCEs or eREGs.

Herein, the eCCE or eREG is the smallest resource mapped to the ePDCCH, which is a RE set composed of some resource elements (Resource Element, RE). Specifically, a PRB pair may be divided into 4 or more eCCEs or eREGs.

In the embodiment of the present invention, the corresponding relationship between the position of the eCCE or the eREG in the resource block pair and the antenna port of the reference signal may be preset, for example be agreed on in a protocol. The preset corresponding relationship between the position of the eCCE or the eREG in the resource block pair and the antenna port of the reference signal may be that, when different user equipments need to be multiplexed in one resource block pair, respective ePDCCHs of the different user equipments are mapped to different eCCEs or eREGs, so that it can be achieved that different user equipments use different antenna ports, or different user equipments use the same antenna port but different reference signal sequences.

Optionally, the first determining unit 31 may be specifically configured to determine the serial number of the eCCE or eREG in the resource block pair, or, the first determining unit 31 may be specifically configured to determine the smallest serial number of the eCCE or eREG in the resource block pair.

As an example, in a case of an extended cyclic prefix (extended CP), currently only the antenna port 7 and antenna port 8 are available to use. In the case of the extended CP, if the number of different user equipments is more than two, then it is impossible to transmit the corresponding reference signal sequence via the antenna ports. In the technical solution provided by the present invention, different user equipments (specifically may be ePDCCHs occupied by different user equipments) are mapped to different eCCEs or eREGs, and the antenna port available to transmit the reference signal sequence can be determined according to the position of the eCCE or the eREG in the resource block pair, as shown in table 1 or table 2, so that in the condition of CP, when there are more than two different user equipments, the reference signal sequences can still be transmitted via the antenna ports, and accordingly the capacity of channel estimation of the user equipment is increased.

This embodiment of the present invention may perform the steps in the method embodiment corresponding to FIG. 1. This embodiment of the present invention may also use corresponding units to perform the steps in the method embodiment to complete the steps in the method embodiments. The illustrations in the method embodiment corresponding to FIG. 1 are applicable to this embodiment of the present invention.

Using the technical solution provided by the present invention, by determining the position of the eCCE or the eREG mapped to the ePDCCH in the resource block pair and then determining the antenna port corresponding to the position, the eCCEs or the eREGs mapped to the ePDCCHs can be multiplexed on the antenna ports, and further, multiple ePDCCHs can use a same antenna port to transmit different reference signal sequences, thereby avoiding the problem that the user equipment can not perform channel estimation for each ePDCCH, which is caused by that the number of ePDCCHs in a resource block pair may be greater than the number of the antenna ports, and thereby the capacity for performing channel estimation of the user equipment is improved.

As shown in FIG. 4(1), a device for transmitting a reference signal sequence is provided by another embodiment of the present invention, this device for transmitting is further extended and refined based on the embodiment according to FIG. 3, therefore, the illustration in the embodiment corresponding to FIG. 3 is applicable to this embodiment. This embodiment of the present invention may also perform the steps in the method embodiment corresponding to FIG. 3. For the steps in the method embodiment, this embodiment of the present invention may also use corresponding units to perform, so as to complete the steps in the method embodiment.

The transmitting device provided by this embodiment, on the basis of the embodiment as shown in FIG. 3, may further include:

A third determining unit 41, configured to determine, according to a corresponding relationship between the position of the eCCE or the eREG in the resource block pair and an initialization parameter of a quasi-random sequence, the initialization parameter of the quasi-random sequence.

As one implementation mode, the corresponding relationship between the position of the eCCE or the eREG in the resource block pair and the initialization parameter of the quasi-random sequence may be preset, for example be agreed on in a protocol. Reference can be made to the method embodiment, and details will not be repeated herein.

A fourth determining unit 42, configured to determine the reference signal sequence according to the initialization parameter of the quasi-random sequence.

Optionally, the third determining unit 41 may specifically be configured to determine, according to the corresponding relationship between the position of the eCCE or the eREG in the resource block pair and the initialization parameter of the quasi-random sequence, a group of initialization parameters of the quasi-random sequence corresponding to the position of at least one eCCE or eREG mapped to the ePDCCH in the resource block pair. Accordingly, the fourth determining unit 42 may specifically be configured to determine, according to the determined group of initialization parameters of the quasi-random sequence, a reference signal sequence supporting the ePDCCH transmission.

Optionally, the third determining unit 41 may specifically be configured to determine, according to the corresponding relationship between the position of the eCCE or the eREG in the resource block pair and the initialization parameter of the quasi-random sequence, at least two groups of initialization parameters of the quasi-random sequence corresponding to the position of at least one eCCE or eREG mapped to the ePDCCH in a resource block pair. Accordingly, the fourth determining unit 42 may specifically be configured to select one group of initialization parameters of the quasi-random sequence from the at least two groups of initialization parameters of the quasi-random sequence, and to determine the reference signal sequence supporting the ePDCCH transmission according to the selected one group of initialization parameters of the quasi-random sequence, for the details, reference can be made to the description of the method embodiments.

Optionally, as shown in FIG. 4 (2), the fourth determining unit 42 may include:

A fifth determining unit 421, configured to determine an initialization value of the quasi-random sequence according to $c_{init}=(\lfloor n_s/2 \rfloor+1)\times(2X+1)\times2^{16}+n_{SCID}$, where, $c_{init}$ is the initialization value of the quasi-random sequence, $n_s$ is a slot number; $n_{SCID}$ is a scrambling identifier; $n_{SCID}$ and/or X is the initialization parameter of the quasi-random sequence.

A sixth determining unit 422, configured to determine the quasi-random sequence corresponding to the initialization value of the quasi-random sequence according to the initialization value of the quasi-random sequence.

A seventh determining unit 423, configured to determine the reference signal sequence according to the quasi-random sequence.

It should be noted that, the device for transmitting the reference signal sequence provided by this embodiment may be a base station, or may also be a user equipment, which will not be limited herein.

Optionally, in the case that the device for transmitting the reference signal sequence provided by this embodiment is a user equipment, as shown in FIG. 5, the user equipment provided by this embodiment may further include a receiving unit 51 which is configured to receive the corresponding relationship between the position of the eCCE or the eREG in the resource block pair and the initialization parameter of the quasi-random sequence. Specifically, the receiving unit 51 may specifically be configured to receive the corresponding relationship between the position of the eCCE or the eREG in the resource block pair and the initialization parameter of the quasi-random sequence sent by a base station via a high-layer signaling.

For example, the high-layer signaling may be a radio resource control (Radio Resource Control, RRC) message, specifically an information element (Information Element, IE) in the RRC message may be used to carry sub-frame parameters, the RRC message may be an RRC message in the prior art, for example, an RRC connection setup message, an RRC connection reconfiguration message or an RRC connection re-establishment message etc., which will not be limited in this embodiment, and the IE in the existing RRC message is extended to carry the corresponding relationship. Or, the RRC message may be different from the existing RRC message in the prior art.

For another example, the high-layer signaling may also be a media access control (Media Access Control, MAC) control element (Control Element, CE) message, the corresponding relationship is carried by adding a new MAC CE.

Using the technical solution provided by the present invention, by determining the position of the eCCE or the eREG in the resource block pair and then determining the antenna port corresponding to the position, the eCCEs or the eREGs mapped to the ePDCCHs can be multiplexed on the antenna ports. Furthermore, multiple ePDCCHs can use a same antenna port to transmit different reference signal sequences, thereby avoiding the problem that the user equipment can not perform the channel estimation to each ePDCCH which is caused by that the number of ePDCCH in the resource block pair may be greater than the number of the antenna ports, and thus the capacity for performing the channel estimation of the user equipment is improved.

Furthermore, if the base station directly notifies the user equipment of the parameters of the reference signal sequence via a high-layer signaling, this approach would result in static binding or semi-static binding between each user equipment and the reference signal sequence, and cause that the user equipment corresponding to the same antenna port and reference signal sequence can never be multiplexed in one resource block pair, and thus the flexibility of multiplexing the user equipments is reduced. Using the technical solution provided in the present invention, dynamic binding between each user equipment and the reference signal sequence can be achieved, and when different user equipments need to be multiplexed in one resource block pair, only respective ePDCCHs of different user equipments need to be dynamically adjusted to be mapped to different eCCEs or the eREGs, and then since the antenna port may be determined according to the position of the eCCE or the eREG in a resource block pair, it can be achieved that different user equipments use different antenna ports, or different user equipments use a same antenna port and different reference signal sequence, so that different user equipments can be multiplexed in one resource block pair, and thereby the flexibility of multiplexing the user equipments is increased.

Furthermore, using the technical solution provided by the present invention, the base station needs not directly notify the user equipment of the parameters of reference signal sequences via a high-layer signaling, and thereby the overhead of the air interface signaling can be reduced and the air interface resource can be saved. Those skilled in the art should clearly understand that, for convenience and simplicity of description, reference may be made to the corresponding process in the aforementioned method embodiments for the specific work process of the foregoing described systems, devices and units, and the details will not be repeated herein.

In the embodiments provided by the present application, it shall be appreciated that the disclosed system, device and method may be implemented in other ways. For example, the aforementioned device embodiments are merely exemplary. For example, the division of the units is just a division by logical functions, and other division mode may be employed in a practical implementation. For example, multiple units or components may be combined or integrated to another system, or some features may be omitted or not executed. Another point is that the displayed or discussed coupling between each other, direct coupling or communication connection may be the indirect coupling or communication connection through some interfaces, devices or units, and may be in the form of electrical, mechanical, etc.

The units described as separate components may be or may not be physically separated. The parts displayed as units may be or may not be physical units, and may be located at a same place or deployed on multiple network units. Some or all of the units may be selected upon actual demand to implement the object of the solution of the embodiment.

In addition, various functional units in the respective embodiments of the present invention may be integrated into one processing unit, or existed as individual physical units, or two or more units may be integrated into one unit. The integrated unit may be implemented in the form of hardware or software functional unit, and may also be implemented in the form of hardware plus software.

The integrated units being implemented in the form of software functional units may be stored in a computer readable storage medium. The aforementioned software functional units may be stored in a storage medium, including several instructions to enable a computer device (e.g., personal computer, server, network facility, etc.) to execute part of the steps of the methods according to the embodiments of the present invention. The storage medium includes various mediums capable of storing program codes, such as a USB disk, a mobile hard disk, a Read-Only Memory (ROM), a Random Access Memory (RAM), a magnetic disc, or an optical disc, etc.

Finally, it should be noted that the foregoing embodiments are merely intended to describe the technical solutions of the present invention rather than limit the present invention. Although the present invention is described in detail with reference to the foregoing embodiments, persons of ordinary skill in the art should understand that modifications may be made to the technical solutions described in the foregoing embodiments, or equivalent substitutions may be made to some technical features, however, these modifications or substitutions do not cause corresponding technical solutions to depart from the spirit and scope of the technical solutions of embodiments of the present invention.

What is claimed is:

1. A method for transmitting a reference signal sequence at a UE or a base station serving the UE, comprising:
    determining a position of an enhanced control channel element (eCCE) or an enhanced resource element group (eREG) mapped to an enhanced physical downlink control channel (ePDCCH) in a resource block pair;
    determining, according to a corresponding relationship between a position of the eCCE or the eREG in the resource block pair and an antenna port of the reference signal, the antenna port of the reference signal, wherein the corresponding relationship between the position of the eCCE or the eREG in the resource block pair and the antenna port of the reference signal comprises that the positions of at least two eCCEs or at least two eREGs correspond to one of antenna ports of the reference signal; and
    transmitting a reference signal sequence over the antenna port of the reference signal;
    before transmitting the reference signal sequence over the antenna port of the reference signal, further comprising:
    determining, according to a corresponding relationship between the position of the eCCE or the eREG in the resource block pair and an initialization parameter of a quasi-random sequence, the initialization parameter of the quasi-random sequence;
    determining, according to the initialization parameter of the quasi-random sequence, the reference signal sequence.

2. The method according to claim 1, wherein the determining the position of the eCCE or the eREG mapped to the ePDCCH in the resource block pair comprises:
    determining a serial number of the eCCE or the eREG mapped to the ePDCCH in the resource block pair.

3. The method according to claim 2, wherein the corresponding relationship between the position of the eCCE or the eREG in the resource block pair and the antenna port of the reference signal comprises:
    in a case of an extended cyclic prefix (CP), the eCCE or eREG of which the serial number is an even number corresponds to an antenna port 7, the eCCE or eREG of which the serial number is an odd number corresponds to an antenna port 8; or, in the case of the extended CP, the eCCE or eREG of which the serial number is an even number corresponds to the antenna port 8, the eCCEs or eREGs of which the serial number is an odd number correspond to the antenna port 7.

4. The method according to claim 2, wherein the corresponding relationship between the position of the eCCE or the eREG in the resource block pair and the antenna port of the reference signal comprises:
    in a case of an extended cyclic prefix (CP), the eCCE or eREG of which the serial number is 1 to n corresponds to an antenna port 7, and the eCCE or eREGs of which the serial number is n+1 to N corresponds to an antenna port 8; or in the case of the extended CP, the eCCE or eREG of which the serial number is 1 to n corresponds to the antenna port 8, and the eCCE or eREG of which the serial number is n+1 to N corresponds to the antenna port 7;
    wherein N is a total number of the eCCEs or eREGs, n is a positive integer greater than or equal to 1 and less than or equal to N.

5. The method according to claim 1, wherein determining, according to the initialization parameter of the quasi-random sequence, the reference signal sequence, comprises:
    determining an initialization value of the quasi-random sequence according to $c_{init}=(\lfloor n_s/2 \rfloor+1)\times(2X+1)\times2^{16}+n_{SCID}$, wherein $c_{init}$ is the initialization value of the quasi-random sequence, $n_s$ is a slot number; $n_{SCID}$ is a scrambling identifier; $n_{SCID}$ and/or X is the initialization parameter of the quasi-random sequence;
    determining the quasi-random sequence corresponding to the initialization value of the quasi-random sequence according to the initialization value of the quasi-random sequence;
    determining the reference signal sequence according to the quasi-random sequence.

6. A device for transmitting a reference signal sequence, comprising:
    a computer readable storage medium storing computer-executable instructions; and
    a processor configured to execute the instructions to perform operations comprising:
    determining a position of an enhanced control channel element (eCCE) or an enhanced resource element group (eREG) mapped to an enhanced physical downlink control channel (ePDCCH) in a resource block pair;
    determining, according to a corresponding relationship between the position of the eCCE or the eREG in the resource block pair and an antenna port of the reference signal, the antenna port of the reference signal, wherein the corresponding relationship between the position of the eCCE or the eREG in the resource block pair and the antenna port of the reference signal comprises that the positions of at least two eCCEs or at least two eREGs correspond to one of antenna ports of the reference signal;

transmitting a reference signal sequence over the antenna port of the reference signal;

determining, according to a corresponding relationship between the position of the eCCE or the eREG in the resource block pair and an initialization parameter of a quasi-random sequence, the initialization parameter of the quasi-random sequence; and determining the reference signal sequence according to the initialization parameter of the quasi-random sequence.

7. The device according to claim 6, wherein the operations further comprise:

determining a serial number of the eCCE or the eREG mapped to the ePDCCH in the resource block pair.

8. The device according to claim 6, wherein the operations further comprise:

determining an initialization value of the quasi-random sequence according to $c_{init}=(\lfloor n_s/2 \rfloor+1) \times (2X+1) \times 2^{16} + n_{SCID}$, wherein, $c_{init}$ is the initialization value of the quasi-random sequence, $n_s$ is a slot number; $n_{SCID}$ is a scrambling identifier; $n_{SCID}$ and/or X is the initialization parameter of the quasi-random sequence;

determining the quasi-random sequence corresponding to the initialization value of the quasi-random sequence according to the initialization value of the quasi-random sequence;

determining the reference signal sequence according to the quasi-random sequence.

* * * * *